United States Patent [19]

Schuppner, Jr.

[11] 4,260,741

[45] Apr. 7, 1981

[54] LOW-DENSITY XANTHAN GUMS

[75] Inventor: Harry R. Schuppner, Jr., El Cajon, Calif.

[73] Assignee: Merck & Co., Inc., Rahway, N.J.

[21] Appl. No.: 51,319

[22] Filed: Jun. 22, 1979

[51] Int. Cl.³ .............................................. C08B 37/00
[52] U.S. Cl. .................................. 536/114; 426/589; 426/590; 426/593; 426/599; 536/21
[58] Field of Search .......................................... 536/114

[56] References Cited

U.S. PATENT DOCUMENTS

| | | | |
|---|---|---|---|
| 2,231,283 | 2/1941 | Pfister | 536/114 |
| 4,053,699 | 10/1977 | Cahalan et al. | 536/114 |

*Primary Examiner*—Johnnie R. Brown
*Attorney, Agent, or Firm*—Gabriel Lopez; Hesna J. Pfeiffer; Julian S. Levitt

[57] ABSTRACT

A form of xanthan gum is disclosed which is less dense than regular xanthan gum and which exhibits an increased hydration rate.

9 Claims, No Drawings

LOW-DENSITY XANTHAN GUMS

CROSS-REFERENCE

Application Ser. No. 044,145, filed May 31, 1979, entitled "Low Calcium Xanthan Gums", J. B. Richmon (inventor), is incorporated herein by reference for its teaching of the preparation and identification of low calcium xanthan gum and low calcium, smooth flow xanthan gum.

BACKGROUND OF THE INVENTION

Xanthan gum is known for its pseudo-plastic behavior, and excellent suspending properties. One problem with commercially available xanthan gum is that it must be mixed with strong agitation to get it into aqueous solution. Another is that in certain low pH solutions, a flocculant appears in the solution upon sitting. This flocculation is readily seen in otherwise clear solutions, such as imitation fruit drinks.

Xanthan gum is typically recovered from its fermentation beer with 2-3 volumes of isopropanol as a constant boiling mixture, then dried and milled.

SUMMARY OF THE INVENTION

A novel form of xanthan gums has now been found which is produced by increasing the ratio of alcohol in the liquid retained by the gum fibers when the gum is dried. After drying and milling, these novel gums exhibit a higher degree of solubility, are less dense, form solutions containing less flocculant precipitate even at low pH, and produce aqueous solutions with higher final viscosities than xanthan gums not so treated.

DETAILED DESCRIPTION OF THE INVENTION

By xanthan gum is meant the extracellularly produced gum made by the heteropolysaccharide-producing bacterium *Xanthomonas campestris* by the whole culture fermentation of a medium comprising a fermentable carbohydrate, a nitrogen source, and other appropriate nutrients. Processes for producing xanthan gum are well-known (e.g. U.S. Pat. No. 3,433,708). Xanthan gum beer, which is a commercially available product, is the post-fermentation contents of xanthan fermentation vats prior to recovery of the gum.

The best evidence presently available suggests that xanthan gum has the formula:

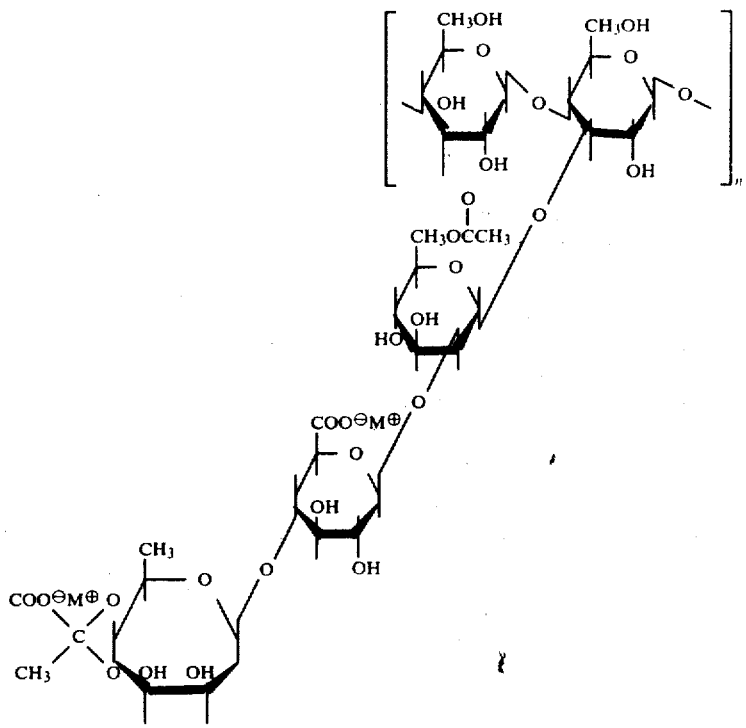

wherein $M^{\oplus}$ is $Na^+$, $K^+$, or $\frac{1}{2} Ca^{++}$. Estimates of the molecular weight range from 2-50 million. The organism *Xanthomonas* produces this gum as an acid which is then converted to a salt in the fermentor, the ratio $Na^+:K^+:Ca^{++}$ in the recovered gum depending on the fermentation media conditions.

As indicated above, production of the acid form of xanthan gum by *Xanthomonas campestris*, NRRL B-1459, under a variety of fermentations conditions is well known. The inventive feature of this application relates to the post-fermentation treatment of xanthan gum beer and presscakes with alcohol, which is independent of the biosynthetic pathway of the *Xanthomonas* organism in its production of the acid form of xanthan gum. It would be apparent therefore to one skilled in the art that the invention is operative using either B-1459 or a proprietary mutant strain of *X. campestris* known by applicant's assignee to produce the acid form of xanthan gum in somewhat higher yields than does B1459. Since the function of the microorganism is merely to produce the acid form of xanthan gum, availability of this mutant strain is not significant to the practice of this invention.

In the known processes for producing xanthan gum, after fermentation is complete, i.e., after the residual carbon source reaches about 0.1%, the fermentation broth is pasteurized and then the gum is recovered by precipitation with about 2-3 volumes of a lower alkyl alcohol, preferably isopropanol. The precipitate is then pressed under vacuum to produce presscakes containing about 50% solids, the balance being an approximately 58:42 mixture of alcohol and water. These presscakes typically are then dried, milled, and sieved to produce a final product.

The novel form of xanthan gum of this invention is produced from presscakes containing at least about 84% rather than 58% alcohol.

The 84% alcohol level can be achieved by various techniques. For example, alcohol precipitation of xanthan gum is normally accomplished with CBM (an 85:15 alcohol:water constant boiling mixture). If the gum is precipitated with two volumes of 99% isopropanol instead of CBM and the resultant presscake is mixed in about 16 volumes of methanol, the low density, high solubility gum of this invention is produced.

For economic reasons, it is preferred not to use 99% IPA precipitation but rather to wash the presscakes which have been produced under prior art conditions.

The aim of the washing procedure is to attain an equilibrium between the interstitial liquid present in the presscake and the surrounding liquid. This can be achieved by simply soaking for long periods. However, the time to reach equilibrium is shortened considerably by mechanical agitation of the presscake during the washing. Various washing techniques can be used to achieve the minimum 84% level. For example, the presscakes can be washed twice with two volumes of CMB. Alternatively, the presscakes could be washed once with 13 volumes of CMB. In a preferred process, the presscakes are washed twice with two volumes of 99% isopropanol (IPA). After the first washing, the presscakes contain about 91% IPA; after the second, 97.5%. If a single washing with IPA is used, 19.5 volumes of 99% IPA is required to reach a final IPA concentration of 97.5%.

Another washing technique is the countercurrent process in which the presscake is equilibrated by passage against an incoming stream of 99% IPA or CBM.

Table 1 shows the relationship between numbers of washing and percent retained alcohol for different washing protocols within the scope of this invention. In all cases, the unwashed presscakes contain about 50% solids, the balance comprising about 58% alcohol and 42% water. The washed presscakes likewise contain about 50% solids; the values given in the table are the % isopropanol in the retained liquid.

TABLE 1

|   | 1st Washing | | 2nd Washing | |
|---|---|---|---|---|
|   | CBM | 99% IPA | CBM | 99% IPA |
| 1 | 80%[1] | — | 84%[1] | — |
| 2 | 84%[2] | — | — | — |
| 3 | — | 91%[1] | — | 97.5%[1] |
| 4 | — | 97.5%[3] | | |
| 5 | — | 85%[4] | | |

[1] Two volumes
[2] 13 volumes
[3] 19.5 volumes
[4] Countercurrent process with one volume IPA Generally, the alcohol content can be computed based on the known, initial alcohol content of the presscake, of the CBM, and of the 99% IPA and of the volumes used. Equilibrium can be assumed to be reached during the mixing period. Actual measurements can be made using a hydrometer to measure the specific gravity of the spent alcohol.

The final presscake is dried (e.g., steam oven at about 60° C.), milled, and then sieved. Although solubility is not highly dependent on mesh size, there is some increase in solubility with mesh size. A gum which passes 70% through a 325 mesh is preferred.

The novel xanthan gums of this invention are characterized in that they have a faster hydration rate, develop higher viscosity in low pH aqueous systems, and have a lower density than xanthan gums prepared from the same fermentation beer which have not either been precipitated with 99% lower alkyl alcohol or received supplementary washing in a lower alkyl alcohol at the presscake stage of recovery. For example, twice washed low calcium xanthan gum (both chunky flow and smooth flow) develops about 20-28% greater viscosity compared to unwashed low calcium xanthan gum in 0.1% aqueous solutions. Washed low calcium xanthan gum (both chunky flow and smooth flow), achieves at least 50% of its final stable viscosity after 5 minutes of hydration time whereas unwashed low calcium xanthan gum requires more time to reach the 50% level. Washed low calcium xanthan gum (both chunky flow and smooth flow) has a density of about one half the density of unwashed low calcium xanthan gum. "Bulk density" is the term used herein to measure density. Bulk density has units of volume and is the inverse of density. Thus, an observation of a bulk density (or volume) increase indicates a density decrease. A 25 g sample of regular xanthan gum fills a volume of about 42 ml whereas a 25 g sample of xanthan gum prepared from presscakes twice washed in CBM fills a 55 ml volume. A comparable sample prepared from presscakes twice washed in 99% isopropanol fills an 84 ml volume.

The novel forms of xanthan gum of this invention can be used for any of the purposes that prior art xanthan gum can be used. However, because of their rapid hydration rates, this can also be used in applications from which xanthan gum had hitherto been excluded. For example, dry mixes which require the addition of a liquid such as water, milk, or oil to produce a variety of instant juices, fruit flavored beverages, gravies, cocoa drinks, soups, salad dressings, etc., have not incorporated xanthan gum because of the high agitation rates necessary to produce the proper amount of body expected of such products. The rapidly soluble xanthan gums of this invention produce the proper mouthfeel under low agitation conditions such as spoon stirring so that dry mixes such as those enumerated above containing xanthan gum as a suspending agent are now possible. The amount of the novel form of xanthan gum used in such mixes depends on the type of final product and on the other ingredients. Final xanthan gum concentrations ranging from 0.01% to 1.0% are recommended.

Because of their high solubility rates and lack of flocculation in low pH solutions, the novel gums of this invention prepared from low calcium xanthan gum presscakes are particularly useful in certain applications. For example, a simple low pH, clear fruit juice drink is readily prepared by adding to tap water and mixing for about 30 seconds a dry mix comprising sugar, calcium phosphate, citric acid, and the novel gum of this invention. The gum readily dissolves, as evidenced by the viscosity developed in 30 seconds, to produce the mouthfeel expected of such a drink. Such a drink shows no evidence of flocculation upon sitting for up to 24 hours.

In a more complicated system comprising sugar, citric acid, sodium citrate, ascorbic acid, $TiO_2$, dyes, and the novel low calcium xanthan gums of this invention, the gums also readily dissolve and produce a stable viscosity after about 30 seconds of stirring.

The process of this invention is applicable generally to xanthan gum beer and presscakes. In addition to beer made under known processes it is applicable to beer and presscakes made under substantially calcium-free conditions. Under these conditions two forms of xanthan gum can be produced. One form, which exhibits chunky flow in oil-in-water emulsion, is described herein as low calcium xanthan gum. The second form is described as low calcium smooth flow xanthan gum. In both forms, no more than 1.6% of the carboxyl groups in the gum are bound to calcium ions. The smooth flow gum is characterized in that oil/water emulsions of said gum have smooth flow rather than chunky flow characteristics.

By substantially free is meant up to about 4 ppm of calcium ion per each 1% of xanthan gum concentration in the completed fermentation broth, and preferably up to about 2 ppm of calcium per each 1% of xanthan gum concentration in the completed fermentation broth. Thus, if the xanthan gum is to be produced at a final concentration of about 2.1–2.3%, the total calcium ion content of the completed fermentation broth should not exceed about 9 ppm and preferably should not exceed about 5 ppm. To obtain such a low calcium medium the calcium content of the water in the fermentation medium may be reduced to the appropriate level by any means, such as chemical means, e.g., ion-exchange treatment, or by distillation or alternatively by the use of soft water. As commercial sources of organic nitrogen contain appreciable amounts of calcium ion, it is important that the nitrogen source of the present invention be a material which is substantially free of calcium ions. An example of such a nutrient material is Promosoy 100, a soy protein concentrate (Central Soya). Use of this material at 500 ppm imparts 1–2 ppm calcium to the medium.

The relationship between the total calcium ion content of the fermentation media, the final xanthan gum concentration in the broth, and the calcium ion content of the isolated xanthan gum is expressed in Table 2.

TABLE 2

| Calcium Ion Relationships | | |
|---|---|---|
| Total Calcium Ion of Media (ppm) | Final Xanthan Gum Concentration (%) | Calcium Content of Xanthan Gum (ppm) |
| 12 | 3 | 400 |
| 8 | 2 | 400 |
| 4 | 1 | 400 |
| 6 | 3 | 200 |
| 4 | 2 | 200 |
| 2 | .1 | 200 |

Xanthan gum is an anionic polysaccharide due to the presence of about 20% glucuronic acid and 4% pyruvate in the molecule. It has been experimentally determined that about 0.026 g calcium will react with all of the carboxyl groups in 1 g of xanthan gum. In other words this amount of calcium is the stoichiometric amount based on the carboxyl groups in the xanthan gum molecule. From this relationship it can be calculated that for each 1% of xanthan gum in the final fermentation broth, a calcium concentration in the broth of 260 ppm is the stoichiometric quantity sufficient to react with all of the carboxyl groups in the xanthan gum molecule. The gum recovered from such a broth will have a calcium content of about 26,000 ppm. The % of carboxyl groups that will react with diminishing amounts of calcium can likewise be calculated.

Low calcium xanthan gum can be described chemically as xanthan gum in which up to about 1.6% of the carboxyl groups are bound to calcium and the remaining carboxyl groups are bound to sodium, potassium, a mixture of sodium and potassium or other noncalcium cations.

During the fermentation of xanthan gum, the fermentation broth is continually monitored to assure good mixing. As the viscosity of the broth increases with the amount of gum produced, frequent monitoring and a corresponding increase in agitation rate assures that all parts of the broth are properly aerated. The criterion of good mixing, well known to those skilled in the polysaccharide fermentation art, is sufficient to produce low calcium xanthan gum.

When it is desired to produce low calcium xanthan gum having smooth flow properties, high shear is required during the fermentation process. The agitation conditions in Table 3 have been found to be adequate to produce low calcium, smooth flow xanthan gum. Agitation comparable to these agitation conditions is defined herein as "high shear".

In an alternate process for producing low calcium, smooth flow xanthan gum, high shear is not necessary. Rather, 0.5% phosphate (0.45% $Na_2HPO_4$ and 0.05% $K_2HPO_4$) is added to the medium at the beginning of the final fermentation process and another 0.5% $Na_2HPO_4$ is added at the end of the process prior to precipitation. In a variation of this process 0.7% phosphate is added at the beginning of fermentation and none at the end. Thus, if between 0.7% and 1% phosphate is used in the final fermentation process, the necessity of high shear conditions is obviated.

TABLE 3

| HIGH SHEAR AGITATION CONDITIONS | |
|---|---|
| Fermentor Size | Agitation Conditions |
| 5 Liter | Three 3¼" flat turbine impellors. The initial agitation is set at 400 RPM's (105 ft/min) and is typically increased to 800–1000 RPM's (211–263 ft/min) by 16–24 hours. |
| 14 Liter | Three 2 15/16" flat blade impellors. The fermentation is started with an agitation rate of 400 RPM's (98 ft/min) and is typically increased to 1000 RPM's (245 ft/min) by 16–24 hours. The agitation can be increased as necessary to provide high shear up to 1500 RPM's (368 ft/min). |
| 30 Liter (8 Gallon) | Two 5 1/16" V-shaped turbine impellors. The initial agitation is 300 RPM's (127 ft/min) which is increased to 700 RPM's (295 ft/min) by 16–24 hours. |
| 70 Liter | Two 5 15/16" flat blade turbine impellors and one 6" propellor. This fermentor is started with an agitation rate of 300 RPM's (149 ft/min) and increased to 600 RPM's (297 ft/min) by 16–24 hours. It can be increased thereafter as needed to provide high shear to a maximum of 750 RPM's (371 ft/min). |

TABLE 3-continued

HIGH SHEAR AGITATION CONDITIONS

| Fermentor Size | Agitation Conditions |
|---|---|
| 1500 Gallon | 3 sets (five 2¼" × 4" blades/set) of disc and turbine impellors; 20" diam. disc., 28" diam. impellor; 150 RPM. |

The high shear must be imparted to the beer during the fermentation process unless high phosphate levels are used. If the beer is subjected to high shear after the fermentation is completed, the resulting gum does not exhibit smooth flow. Likewise, it is preferred to continue the high shear conditions throughout the entire fermentation process.

The smooth flow obtainable with low calcium xanthan gum is liable, in some cases, to be degraded by high temperature pasteurization conditions. For this reason, it is preferable to pasteurize at temperatures which do not exceed about 80° C.

A correlation has been found between the smooth flow property of low calcium xanthan gum and the viscosity of an oil/water emulsion made up from the gum. The following test protocol can therefore be followed to determine whether a low calcium xanthan gum can also be characterized as having smooth flow.

TEST METHOD 1

3.5 g of low calcium xanthan gum is slurried in 20 g of vegetable oil. The slurry is added to 300 ml tap water in a Sunbeam solid state Waring blender and mixed for 20 seconds at the lowest speed (stir button). Mixing is stopped, 13 g of NaCl is added, and the mix is agitated at the highest speed (liquify button) for 10 seconds. The entire emulsion is poured into a 400 ml beaker and viscosity readings are obtained at room temperature on a Brookfield LVF viscometer, spindle 3 at 60 rpm. The xanthan gum used should contain between 86 and 92% solids and should be milled so that at least 98% passes through an 80 mesh screen and less than 40% passes through a 325 mesh screen. A low calcium xanthan gum is smooth flow if under these conditions viscosity readings of less than 1650 cP are obtained. It is preferred that the viscosity be less than 1600 cP.

Alternative, although less reliable, tests require visual observations. For example, the emulsion prepared as above is observed while being poured and its flow characteristics noted.

The present invention is embodied in novel forms of xanthan gums which are less dense, are more easily hydrated, develop higher viscosity, and contain less flocculant precipitate than corresponding xanthan gums.

The invention is further embodied in novel forms of low calcium xanthan gum which produce no flocculation in low pH aqueous systems.

The invention is further embodied in a process for producing said novel gums.

The invention is further embodied in dry mixes from which edible foodstuffs can be prepared.

The following examples, intended to be illustrative and not limiting, further describe the invention.

EXAMPLE 1

99% IPA Precipitation Method 1000 g of xanthan gum beer at 38° C. is added to 2000 g 99% IPA at 24° C. with medium shear. A hard fiber precipitate is obtained. The precipitate is collected and drained. About 30 g of the fiber is placed in 500 ml methanol and sheared in a Waring blender for 2-3 minutes. The precipitate is very hard and low in water content. The precipitate is allowed to drain freely without applied pressure and then dried under heating lamps. The dried precipitate is milled 100% through 325 mesh. Compared to unwashed (regular) xanthan gum also milled 100% through 325 mesh the following density data are obtained.

|  | Weight | Volume |
|---|---|---|
| Washed gum | 1 g | 5.13 cm³ |
| Unwashed gum | 1 g | 0.78 cm³ |

The xanthan gum of the invention prepared according to this method has a bulk density about 6.6 times greater than a comparable xanthan gum.

To compare the solubility rates of regular xanthan gum with the gum of this invention, solutions in the commercially available product Tang® are prepared. 14 g Tang are mixed with 4 oz. tap water and 0.12 g gum. Viscosity readings are taken after 30 sec. of spoon stirring on a Brookfield LVF viscometer at 60 rpm, spindle 1.

|  | Visc. (cP) |
|---|---|
| Water | 2.5 |
| Tang (no gum) | 3.5 |
| Tang w/xan. gum | 5.0 |
| Tang w/washed xan. gum | 11.0 |

The gum of this invention thus imparts about twice the viscosity to an aqueous system compared to regular xanthan gum. Only a slight increase in viscosity is seen in cold milk or hot chocolate systems when similar comparisons are made.

EXAMPLE 2

Presscake Washing Method

Xanthan gum presscakes are obtained from a production fermentation vat and designated "A". Presscakes are also obtained from pilot plant fermentors run under low calcium conditions and designated "B" and "C". The samples are washed once and twice with either 99% IPA or CBM. All samples are then pressed, dried (steam oven at ≈60° C.), milled (Wiley Mill), and sieved to obtain through 80 mesh and through 325 mesh fractions.

Although mesh size affects solubility, the correlation between alcohol washing and solubility is greater than the correlation between mesh size and solubility as shown in Table 4. All the presscakes of Table 4 are regular xanthan gum presscakes obtained from production fermentation vats and washed with 99% IPA.

TABLE 4

Solubility vs. Mesh Size

| Mesh | Time (min.) | Wash | Visc. (cP) |
|---|---|---|---|
| 80 | 1 | none | 2.2 |
|  | 5 |  | 2.8 |
|  | 10 |  | 5 |
|  | 60 |  | 6.4 |
| 80 | 1 | 1X | 3 |
|  | 5 |  | 4 |

TABLE 4-continued

Solubility vs. Mesh Size

| Mesh | Time (min.) | Wash | Visc. (cP) |
|---|---|---|---|
| | 30 | | 8 |
| | 60 | | 11.2 |
| 80 | 1 | 2X | 3.3 |
| | 5 | | 4.8 |
| | 30 | | 9.5 |
| | 60 | | 13.2 |
| 325 | 1 | none | 4 |
| | 5 | | 5.2 |
| | 30 | | 7.5 |
| | 60 | | 7.9 |
| 325 | 1 | 1X | 5.7 |
| | 5 | | 7.1 |
| | 30 | | 12.6 |
| | 60 | | 13.2 |
| 325 | 1 | 2X | 6.9 |
| | 5 | | 9.5 |
| | 30 | | 15.4 |
| | 60 | | 15.5 |

Thus, the 325 mesh unwashed gum at one hour shows a slight increase in viscosity over the comparable 80 mesh gum (7.9 cP vs. 6.4 cP), whereas a single IPA washing almost doubles the 1-hour viscosity of the 80 mesh gum (11.2 cP vs. 6.4 cP).

Blends of various 325 mesh xanthan gums (1.4 g) with Tang® (140 g) are prepared by rolling on a laboratory roller for about 1 hour. 14 g aliquots are dispersed in tap water (125 ml) by spoon stirring for 30 sec. in a 200 ml beaker. Viscosity readings are taken at 1, 5, 30 and 60 sec. on a Brookfield LVF viscometer, UL adaptor, 60 rpm. A comparable blend using KELTROL® F. (commercially available xanthan gum) is also prepared. The final xanthan gum concentration is 0.1%.

The following data (Table 5) show that washing presscakes with either IPA (99%) or CBM increases the hydration rate and final viscosity of these low pH aqueous solutions.

TABLE 5

Viscosity and Hydration Rate In Low pH Solutions

| | | Visc. (cP) | | | |
|---|---|---|---|---|---|
| Gum | Wash | 1 min. | 5 min. | 30 min. | 60 min. |
| A1 | none | 3.9 | 5.25 | 7.5 | 7.9 |
| A2 | 1 X IPA | 5.68 | 7.1 | 12.6 | 13.2 |
| A3 | 2 X IPA | 6.9 | 9.5 | 15.4 | 15.5 |
| A4 | 1 X CBM | 5.6 | 7.4 | 9.5 | 9.3 |
| A5 | 2 X CBM | 6.5 | 8.2 | 13.0 | 13.8 |
| B1 | none | 4.31 | 5.05 | 6.6 | 6.5 |
| B2 | 1 X IPA | 5.4 | 6.56 | 8.4 | 8.45 |
| B3 | 2 X IPA | 4.65 | 6.22 | 7.92 | 7.83 |
| C1 | none | 5.15 | 6.62 | 7.85 | 7.9 |
| C2 | 1 X IPA | 6.12 | 8.0 | 12.5 | 12.5 |
| C3 | 2 X IPA | 5.75 | 7.75 | 12.0 | 12.6 |

EXAMPLE 3

Simplified System

Following the procedure of example 2 but using a simpler system comprising 1 g xanthan gum, 93 g fine granulated sugar, 1.9 g monocalcium phosphate, and 1.5 g anhydrous citric acid instead of xanthan gum and Tang, comparable results are obtained showing that either one or two washings with IPA (99%) increase both hydration rate and final viscosity of both regular and low calcium xanthan gum.

Flocculation as determined by the volume of precipitate is measured on equal volumes of solution at ~2000 rpm on an International Centrifuge. The data are shown on Table 6.

TABLE 6

PRECIPITATION IN SIMPLIFIED SYSTEM

| Gum | Wash. | Vol. Ppt. (ml) |
|---|---|---|
| A1 | none | 1.0 |
| A2 | 1X IPA | 0.6 |
| A3 | 2X IPA | 0.15 |
| B1 | none | 0.05 |
| B2 | 1X IPA | 0.01 |
| B3 | 2X IPA | <0.01 |

EXAMPLE 4

Bulk Density Comparisons

Xanthan gum presscakes are obtained as in example 2 from a production fermentation vat and washed in accordance with this invention. KELTROL® F. is used for comparison. 25 g of each gum (325 mesh) is placed in a graduated 100 ml cylinder. The volume is measured (in ml). The cylinder is then tapped 100 times and the volume measured again. The data of Table 7 are obtained, showing the increase in bulk density obtained by alcohol washing of presscakes.

TABLE 7

DENSITY COMPARISONS

| | | Bulk Density | | | |
|---|---|---|---|---|---|
| Sample | Wash | Untap'd | Increase | Tapped | Increase |
| KTL F | none | 42 | — | 34 | — |
| A5 | 2X CBM | 55 | 31% | 41 | 21% |
| A3 | 2X IPA | 84 | 100% | 55 | 62% |

What is claimed is:

1. A form of xanthan gum wherein the retained liquid is at least 84% lower alkyl alcohol.

2. A gum of claim 1 where the gum is low calcium xanthan gum.

3. A gum of claim 2 where the gum is low calcium, smooth flow xanthan gum.

4. A gum of claims 1 or 2 where the retained liquid is at least 91% lower alkyl alcohol.

5. A gum of claim 4 where the alcohol is isopropanol.

6. A gum of claim 4 where the retained liquid is at least 97.5% isopropanol.

7. In a process for preparing xanthan gums from fermentation beer which comprises precipitation with lower alkyl alcohol, drying, and milling, the improvement which comprises increasing the lower alkyl alcohol content of the retained liquid of said gums to at least 84% prior to drying and milling.

8. The process of claim 7 where the alcohol content is at least 91% and the alcohol is isopropanol.

9. The process of claim 8 where the alcohol content is at least 97.5%.

* * * * *